United States Patent [19]

Kahn

[11] 4,071,645
[45] Jan. 31, 1978

[54] AQUEOUS COATING COMPOSITION

[75] Inventor: Joe E. Kahn, Hartland, Wis.

[73] Assignee: Acme Chemical Company, Milwaukee, Wis.

[21] Appl. No.: 666,185

[22] Filed: Mar. 12, 1976

[51] Int. Cl.² .............................. B05D 3/04
[52] U.S. Cl. .................................. 427/340; 106/6; 106/8; 106/10; 106/230; 106/238; 260/23 R; 260/23 XA; 260/23 S; 260/27 R; 260/28.5 A; 260/28.5 AV; 260/28.5 B; 260/28.5 D; 260/28.5 R; 260/29.6 R; 260/29.6 MN; 260/29.6 ME; 424/7; 428/500; 427/385 R
[58] Field of Search .............. 106/6, 8, 10, 230, 238; 424/7; 260/23 R, 23 AM, 23 XA, 23 S, 27 R, 28.5 A, 28.5 AV, 28.5 B, 28.5 D, 28.5 R, 29.6 R, 29.6 MN, 29.6 ME; 427/385, 340; 428/500

[56] References Cited

U.S. PATENT DOCUMENTS

| 3,467,610 | 9/1969 | Fiarman et al. ...................... 260/22 |
| 3,808,036 | 4/1974 | Zdanowski ........................ 260/27 R |
| 3,933,511 | 1/1976 | Heintzelman et al. ......... 260/28.5 A |

*Primary Examiner*—Melvyn I. Marquis
*Attorney, Agent, or Firm*—Michael, Best & Friedrich

[57] ABSTRACT

The aqueous coating composition, which is particularly adaptable for use as a household floor polish or a temporary protective coating for various articles, contains a non-volatile, solid film former, such as an acrylic copolymer, dispersed in the aqueous phase or base, and a water-soluble, acid-base indicator, such as thymolphthalein, which is colored at a pH above a predetermined level and is colorless at a lower pH. Upon being applied on the surface of a substrate, a substantially colorless film is formed thereon upon the evaporation of the water and the color indicator becomes an integral part of the dried film. Upon the application of an aqueous alkaline cleaning or stripping solution having a pH above that required to effect a color change of the color indicator, (e.g., above about 11.6 when thymolphthalein is used), the film changes to a distinctive color (e.g., blue when thymolphthalein is used) so that one can readily observe whether the old film has been completely removed before the surface becomes dry.

The film former can include optional ingredients, such as a wax, an alkali-soluble resin and a permanent plasticizer to improve the wear resistance and finish properties of the resultant film. The coating composition can also include fugitive plasticizers or coalescing aids to facilitate the formation of a smooth, continuous protective film.

21 Claims, No Drawings

AQUEOUS COATING COMPOSITION

BACKGROUND OF THE INVENTION

This invention relates to coating compositions which are applied to a surface, such as a floor, metal, plastic, glass or wood surface, and dry as a substantially clear, protective film.

Aqueous base coating compositions which dry to form a substantially clear and colorless protective film on the surface of the substrate to which they are applied are widely used, particularly as polishes for resilient flooring, decorative clear coatings for metals, plastics, glass or wood. Various compositions are marketed for stripping or removing the film after dirt or staining materials have become embedded in the film or prior to use or further processing of the article. These compositions typically are aqueous dispersions or are diluted in water and disrupt the film so it can be conveniently removed. When these compositions are applied to the surface, the entire surface becomes wet and one frequently cannot readily observe whether the film has been completely removed until the surface becomes dry. After drying, the non-uniform removal of the film becomes apparent and reapplication of the stripper is required. In use, up to as many as three applications of the stripper composition may be required to completely remove the film.

The problem of "missed spots" during stripping becomes acute if a metal piece is to be plated, as interference with even deposition of the plating causes rejects.

Some manufactured goods such as pots and pans can be protected against scratching during shipment and while on display with an easily removed clear, glossy protective coating. Normal use directions included with such utensils usually specify washing the utensil with warm soapy water prior to use. If the protective coating turns color, it can be easily observed when all of the coating has been removed.

SUMMARY OF THE INVENTION

A primary object of the invention is to provide an aqueous base coating composition which, after application to a substrate, is capable of forming a substantially colorless protective film upon the evaporation of water and the resultant dried film, upon application of an alkaline, aqueous cleaning or stripper composition, will change to a distinct color and retain that color as long as it remains wetted by the cleaning or stripper composition prior to removal.

Other objects and advantages of the invention will become apparent upon reviewing the following detailed description and the appended claims.

the coating composition of the invention is driable to a substantially clear finish and includes an aqueous phase or base, a dispersed, non-volatile, solid film former capable of being deposited in a smooth protective film on a substrate upon evaporation of the water of the aqueous phase, a sufficient amount of a dispersing agent to form a stable dispersion of the film former in the aqueous phase and permit the film former to deposit therefrom as a smooth film on the substrate upon evaporation of the water, and a water-soluble, acid-base indicator which is colored at a pH above a predetermined level and is colorless at a lower pH. The pH of the coating composition is maintained at a level below that where the color indicator changes from colorless to color.

When the protective film is formed upon evaporation of the water of the aqueous phase or base, the color indicator becomes an integral part of the protective film. Upon the application of an aqueous cleaning or stripper composition having a relatively high alkalinity, i.e., a pH above that required to effect a color change of the color indicator, the film changes to the color of the color indicator making it readily visual to the user as long as it remains on the substrate and is wetted by the alkaline cleaning or stripper composition. This permits one to readily observe whether the film has been completely removed from the substrate before drying.

DESCRIPTION OF THE PREFERRED EMBODIMENTS

The coloring feature provided by the invention can be incorporated into most water carried coatings including conventional aqueous base polish compositions, either non-buffable, self-polishing or buffable types, temporary protective coatings, clear aqueous rust retardant coatings, etc. These coatings dry to a substantially clear film and include non-volatile, solid film formers dispersed in the aqueous base and an emulsifying and dispersing agent for dispersing the film former in the aqueous phase or base. The emulsifying and dispersing agent, which preferably is anionic or nonionic, serves a well known function and is present in an amount sufficient to form a stable dispersion of the film former in the aqueous base and permits the film former to deposit therefrom upon evaporation of the water. The term "dispersion" as used herein broadly encompasses systems wherein the film former is uniformly dispersed throughout the aqueous phase as an emulsion, as a colloidal suspension, as a solute, or a combination thereof, e.g., partially in solution and partially in emulsion form.

As is well known in the art, various other ingredients can be included in aqueous base polish compositions and temporary protective coatings, such as plasticizers to facilitate film formation at room temperature and/or improve flexibility, surfactants or wetting agents to further facilitate the deposition of a smooth, continuous film and alkali-soluble resins to facilitate eventual removal of the film and/or improve gloss. The only important limitations on the type of specific conventional ingredients used are that the resultant dispersion must have an overall pH below a level at which the color indicator changes from colorless to a colored state and the ingredients which deposit as part of the film do not completely inhibit the required reaction of the color indicator with the cleaning or stripper composition to provide the desired color change, and a substantially clear and colorless film is provided upon drying.

The color indicators used in the polish compositions of the invention are conventional water-soluble, acid-base indicators which are colored at the pH of the stripper solution and are colorless at a lower pH. Representative examples of suitable color indicators and the color imparted thereby include thymolphthalein (blue), phenolphthalein (reddish pink), ortho-cresolphthalein (red), ethyl bis (2,4-dinitrophenyl) acetate (blue-green), p-nitrophenol (yellow), m-nitrophenol (yellow), m-dinitrophenol (yellow), 1,3,5-trinitrophenol (orange) and 2,4,6-trinitrophenol (orange). Thymolphthalein, phenolphthalein, ortho-cresolphthalein and ethyl bis (2,4-dinitrophenyl) acetate are preferred because they provide a more vivid color which is readily visible when the coating composition is applied to a wider variety of different colored substrates.

The amount of color indicator used depends primarily upon the specific one selected, the desired degree of coloration of the film during stripping, the original pH of the coating composition and the pH of the cleaning or stripper composition to be used. Amounts within the range of about 0.003 to about 2 weight %, based on the total weight composition, generally are preferred. Amounts less than about 0.003 weight % will provide some coloration upon application of a stripping composition; however, the degree of coloration imparted to the film may not make it vivid enough to be readily discernible when the coating composition has been applied on a non-white substrate. While amounts higher than 2 weight % can be used, such larger amounts provide little or no additional coloration and, thus, represent an unnecessary additional cost. The most preferred amount of the color indicator is within the range of about 0.06 to about 0.5 weight %, based on the total weight of the composition.

It has been found that the pH of the cleaning or stripper composition must be increased to a level above that normally required for the above-mentioned acid-base indicators to change from a colorless to a definite color. For instance, in a simple alkaline solution, it has been reported and confirmed by laboratory tests that the thymolphthalein changes from colorless to a blue color within a pH range of 9.4 to 10.6 phenolphthalein changes from a colorless to a pink color within a pH range of 8.4 to 10.0, ortho-cresolphthalein changes from colorless to a reddish purple color within a pH range of 8.1 to 9.9 and ethyl bis (2,4-dinitrophenyl) acetate changes from colorless to a blueish green within a pH range of 8.4 to 9.6. When thymolphthalein is used as the color indicator in the coating composition of this invention, the pH of the cleaning or stripper composition usually should be at least 11.6 so that film will turn a vivid blud color. When phenolphthalein, ortho-cresolphthalein or ethyl bis (2,4-dinitrophenyl) acetate is used as the color indicator, the pH of the cleaning or stripper composition should be at least 10.5 so that the film will turn a reddish pink color, a reddish purple color and a blueish green color, respectively. While it is not fully understood why this higher pH is required, it appears that the various resins, polymers and waxes commonly used as film formers somehow tend to inhibit the normal disassociation of the acid-base indicators.

The film former used generally can be any conventional non-volatile, solid film-formers which are emulsifiable or dispersable in conventional emulsifying and dispersing agents including waxes, synthetic polymers, natural and synthetic resins, particularly alkali-soluble resins, and mixtures thereof.

Representative examples of suitable natural and synthetic resins and polymers include shellac, manila loba, polyvinyl acetate, polyvinyl chloride-acetate, polyvinyl choride, copolymers of vinylidene chloride and acrylonitrile, terpene resins, terpene phenolic resins, copolymers of vinyl acetate and crotonic acid, copolymers of butadiene and styrene, polyvinylidene chloride, polyacrylates, shellac-modified polystyrenes, terpolymer latexes of the type disclosed in U.S. Pat. No. 3,406,133, acrylic interpolymers of the type disclosed in U.S. Pat. No. 3,429,842, and metal complexed or ionic-crosslinked polymers of the type disclosed in U.S. Pat. Nos. 3,808,036 and 3,467,610, particularly acrylic copolymers which are ionic-crosslinked with a water-soluble polyvalent metal compound, such as zinc or zirconium. Acrylic interpolymers or copolymers, particularly the metal complexed or ionic-crosslinked type, and mixtures thereof are the preferred synthetic polymer film formers because of their high detergent resistance, better recoating properties and ease of removal with an alkaline cleaner of stripper composition. Even though some of these copolymers may be soluble in the resultant aqueous dispersion of the polish composition when a relatively high pH is used, they are commonly called water-insoluble polymers.

Many synthetic polymer film formers are commercially available as emulsions or dispersions which can be included as part of the coating composition as is without the addition of any further emulsifying and dispersing agents. Representative examples of such commercially available acrylic polymer and copolymer emulsions or dispersions include, Rhoplex B-832, Rhoplex B-1141 and Acrysol WS-24 supplied by Rohm and Haas Company, Richamer R-724 and Richamer R-900 supplied by The Richardson Company, Ionac X-180 and Crilicon 642 supplied by Ionac Chemical, and Neocryl A-602 supplied by Polyvinyl Chemical Industries. Similarly, many alkali-soluble synthetic resins are commercially available as emulsions or dispersions, such as Acrysol 527 supplied by Rohm and Haas Company, which can be included as part of the polish composition as is without the addition of any further emulsifying and dispersing agents. Many of these commercially available compositions typically employ an anionic emulsifying system and have a pH ranging from about 6 to 11 while others may have a pH as low as 3.0 or lower and employ a nonionic emulsifying system.

While not necessary for some applications, a wax or mixture of waxes can be included as part of the film former to improve scuff, scratch and black mark resistance. For a non-buffable, self-polishing composition, the amount of wax used should not be over about 8 weight %, based on the total weight of the composition, preferably, within the range of about 0.5 to 6 weight %. For a buffable composition, the wax content should be at least 8 weight %. Representative examples of suitable waxes or mixture waxes include waxes of a vegetable, animal, synthetic, and/or mineral origin, or mixtures thereof. These waxes are well known in the art and include carnauba, candelilla, lanolin, cocoa butter, cottonseed, stearin, Japan wax, bayberry, myrtle, mace, palm kernel, beeswax spermacetti, Chinese insect, mutton tallow, emulsifiable polyolefin waxes, such as polyethylene, polypropylene, polybutylene and copolymers thereof, waxes obtained by the hydrogenation of coconut oils or soybean oils, and the mineral waxes such as microcrystalline paraffin, ceresin, montan, ozokerite, and the like.

Wax film formers are commercially available as emulsions or dispersions which can be included as part of the coating composition as is without the addition of any further emulsifying and dispersing agents. Representative examples of such commercially available wax emulsions include Emulsion 341 supplied by Chemical Corporation of America and Poly N-110 supplied by Ionac Chemical, both of which are alkaline stable emulsions of an ethylene-propylene copolymer.

The coating composition preferably is compounded by admixing commercially available aqueous emulsions or dispersions of the film former, both the resin or synthetic polymers and the wax when used, with water and the color indicator in any convenient manner. The total amount of each dispersion in water is adjusted to provide the solid content desired in the final product, which usually is within the range of about 8 to 45 weight %, preferably about 12 to about 20 weight % based on the total weight of the composition, and to provide a pH below that at which the indicator changes to the colored state. The total content of film former usually is within the range of about 6 to about 42 weight %, preferably within the range of about 10 to about 18 weight %, based on the total weight of the composition.

When the film formers are dispersed separately, rather than using commercially available emulsions or dispersions during compounding, anionic or nonionic emulsifying and dispersing agents well known and customarily used in the art generally are preferred. Suitable anionic emulsifying and dispersing agents include the sodium salts of the higher fatty acid sulfates, such as that of lauryl alcohol, the higher fatty acid salts, such as the oleates or stearates of morpholine, triethanolamine or mixed ethanolamines, or any of the nonionic types, such as ethylene oxide-modified alkyl phenols, of which tert-octyl phenol or nonyl phenol modified by 2 to 60, preferably 9 to 40, ethylene oxide units is representative, ethylene oxide-modified higher fatty alcohols, such as lauryl alcohol, containing 20 to 50 ethylene oxide units, similarly modified long-chain mercaptans, fatty acids, amines, or the like.

When the wax is added as a separate emulsion or dispersion, the emulsifying and dispersing agents mentioned above can be used; however, amine salts of soap, such as ethanolamine oleate or stearate, are most useful. Suitable agitating apparatus, such as a conventional homogenizing mill can be used to assist in forming the emulsion or dispersion. When an emulsifiable polyolefin is used as the wax, emulsions or dispersions thereof can be conveniently prepared by using conventional inversion emulsification techniques under superatmospheric pressure. In general, the emulsification or dispersion process includes admixing the wax, a nonionic emulsifying agent, and water at room temperature, and thereafter heating the resulting mixture in a pressure vessel up to at least autogenous pressure or above, stirring the mixture during heating, admixing additional amounts of water to achieve the desired solid content, and then cooling the resultant dispersion.

Suitable alkaline or buffering agents, such as borax, sodium hydroxide, potassium hydroxide, ammonia or amines can be added as required to adjust the overall pH of the coating composition to the desired value.

To facilitate film formation, conventional permanent and/or fugitive plasticizers can be included in the composition. Permanent plasticizers, if used in the relatively large proportions, may tend to decrease the wear resistance and water resistance of the resulting film. Therefore, they should be used in relatively small amounts, i.e., up to not more than about 5 weight %, based on the total weight of the composition. More than this amount can result in film tackiness. When the coating composition includes acrylic copolymer film formers which are inherently tough and flexible, fugitive or semifugitive plasticizers, often also referred to as coalescing aids, may be preferred rather than permanent plasticizers. As well recognized in the art, fugitive plasticizers or coalescing aids serve to partially deform the film formers during the drying, so as to enhance the formation of a smooth, continuous film, and then evaporate. When used, the amount of the fugitive plasticizer or coalescing aid, preferably should not be more than 7 weight %, based on the total weight of the composition, because greater amounts do not provide increased performance benefits. In order to facilitate the initial formation of a continuous film and impart some flexibility in the film, mixtures of fugitive and permanent plasticizers can be used.

Representative examples of suitable fugitive plasticizers include high boiling alcohols and their ethers, such as monoethyl or monomethyl ether of diethylene glycol (Carbitol), ethylene glycol, diethylene glycol, isophorone, benzyl alcohol, and 3-methoxybutanol-1. Representative examples of suitable essentially permanent plasticizers include benzyl butyl phthalate, dibutyl phthalate, dimethyl phthalate, triphenyl phosphate, triethyl phosphate, tributyl phosphate, 2-ethyl hexyl benyl phthalate, butyl cyclohexyl phthalate, mixed benzoic acid and fatty acid esters of pentacrythritol, poly-(propylene adipate) dibenzoate, diethylene glycol dibenzoate, tetrabutyl-thiodisuccinate, butyl phthalyl butyl glycolate, acetyl tributyl citrate, dibenzyl sebecate, tricresyl phosphate, toluene ethyl sulfonamide the di-2-ethylhexyl ester of hexamethylene glycol diphthalate, di-(methylcyclohexyl)-phthalate, tributoxyethyl phosphate, and tributyl phosphate. The particular plasticizer and the amount thereof used are chosen in accordance with the demand for compatability and efficiency in lowering the film-forming temperature. Some plasticizers, such as tributoxyethyl phosphate, also serve as leveling agents.

When used, the plasticizer or plasticizers can be admixed with the film former dispersion or emulsion water, color indicator and other ingredients in any convenient manner. If desired, organic solvents can be used in relatively small amounts.

Optional minor ingredients customarily used in the art can be added to the coating composition including surfactants or wetting agents, such as the fluorocarbon surface active agents disclosed in U.S. Pat. Nos. 3,163,547 and 2,937,098, anti-foaming agents, preservatives, such as formeldehyde, and fragrance additives when required to mask the odor of certain plasticizers. When wetting agents are used, the amount thereof should be kept to a minimum because of their tendency to cause foaming. Generally, amounts less than about 1.0 weight %, offers best results.

While the coating composition of the invention can be used for a wide variety of applications, it is particularly suitable as a household floor polish for lighter-colored resilient floor coverings, such as linoleum and asphalt, vinyl and vinyl-asbestos tile and as a temporary protective film for articles, such as kitchen utensils, and a temporary corrosion-resistant film for metals which are to be subsequently treated.

When used as a floor polish, the dried clear film formed will change to distinctive color upon the application of a high-alkaline aqueous cleaning or stripping solution capable of disrupting the film and having a pH above the level at which the particular color indicator changes from colorless to a color. On the other hand, the film can be repeatedly washed with soapy solutions or diluted alkaline cleaning solutions without changing color. For stripping, either a solvent base or an amine base stripping solution can be used.

Solvent base stripping solutions generally are preferred because they are more effective for all types of film formers, usually provide better color activation and the pH thereof can be increased to a level necessary to activate the color in the film without introducing the undesirable odor associated with amines. The solvent in such a stripping solution disrupts or partially dissolves the film in a manner so that the color indicator therein is exposed to the aqueous alkaline portion of the stripper solution and changes to a distinctive color, thereby indicating that the film is ready for removal, such as by mopping, and often-times without the use of surface abrasion. The unremoved film retains its color as long as it remains wetted by the stripping solution, permitting one to readily observe whether or not all of the old film had been removed before the floor dries. Solvents suitable for use in solvent base stripping solutions include glycol ethers, particularly those in the so-called Carbitol Cellusolve series, and weak alcohols, such as isopropyl alcohol. In any event, the solvent base stripping solution must be compatible with the particular type of floor covering. That is, it must not be so strong to deleteriously affect the flooring finish. When an alcohol is used, the quantity thereof must be below a level where the stripping solution becomes flammable within the meaning of various government regulations.

While solvent base stripping solutions generally are preferred for reasons mentioned above, their effectiveness is decreased much more rapidly with increased dilution with water than amine base stripping solutions. For example, it usually is not practical to use a water to solution dilution ratio much greater than about 3:1 or 4:1 without supplementing with substantial scrubbing or abrasion with a scrubbing device.

Amine base stripping solutions are quite effective for polish compositions containing metal-complexed or ionic-crosslinked acrylic copolymers. As used herein, the term "amine base stripping solutions" encompasses aqueous solutions containing ammonia or one or more amines as the active ingredient. The metal ions of such polymers preferentially complex with the ammonium and/or amino ions in the stripping solution, thereby freeing the carbonyl groups so that the film becomes alkali-sensitive. This results in severe swelling of the polymer and eventual disruption of the film, exposing the color indicator therein to the aqueous alkaline portion of the stripping solution and causing the film to change to a distinctive color. As with a solvent based stripping solution, the unremoved film retains its color so long as it remains wetted by the amine base stripping solution.

Amines, other than ammonia, suitable for use in amine base stripping solutions include mono-, di- and triethanol amines, phenyl diethanol amines and 2-dimethylamino-2-methyl-1-propanol. Many amine based stripping solutions can be diluted with water to a water to solution ratio up to as high as 20:1 without supplementary abrasions, particularly when metal-complexed or ionic-crosslinked acrylic copolymer is used as the film former.

It has been found that up to five coats of the polish composition can be applied without significantly affecting the ability of the color indicator to change color upon the application of a cleaning or stripping solution. Therefore, in order to take maximum advantage of the coloring feature provided by the polish composition of the invention, it is best not to apply more than five coats before stripping. When there is a build-up of several coats of old film, it is best to allow the cleaning or stripping solution to stand, usually for 2 minutes or more, before mopping up so it can penetrate the film and effect the desired color change.

As mentioned above, the coating composition can be used as a clear protective coating for protecting articles from scratching during shipping and while on store shelf display. This coating, while translucent in the wet state, dries clear and glossy. The protective film deposited on the surface replaces the need to package the articles in polyethylene bags for shipping. Before initial use, a cleaning solution above the pH required to activate the indicator (and to disrupt the film) is applied. The color is activated and the protective film is removed as indicated by subsequent disappearance of the color.

The following examples are presented to exemplify preferred embodiments of the invention and should not be construed as limitations thereof.

EXAMPLE 1

A polish composition was prepared with the following formulation:

| Ingredient | Weight % |
| --- | --- |
| Deionized Water | 27.99 |
| Surfactant[1] | 0.95 |
| Tributoxyethyl phosphate | 2.83 |
| Diethylene glycol methyl ether | 5.70 |
| Anti-foaming agent[2] | 0.01 |
| Fragrance | 0.01 |
| Formaldehyde | 0.11 |
| Polyacrylate metal interpolymer emulsion, 38% solids[3] | 51.66 |
| Ethylene-propylene copolymer emulsion, 25% solids[4] | 10.54 |
| Phenolphthalein | 0.20 |
| | 100.00 |

Notes:
[1]Zonyl FSP, an emulsion of a fluorocarbon surface active agent containing 1% active ingredients supplied by E.I. duPont Nemours and Co.
[2]SAG 4220, an organo-modified polysiloxane polymer containing 20% active ingredients supplied by Union Carbide.
[3]Richamer 724, supplied by The Richardson Co.
[4]Poly N-110, supplied by Ionac Chemical.

The water, surfactant, plasticizers, anti-foaming agent, fragrance and preservative (formaldehyde) were first admixed in a vessel at room temperature and the polymer emulsion, wax emulsion and the color indicator were then admixed with the resultant mixture at room temperature. The resultant milky, whitish translucent composition, which had a pH of approximately 8.5 to 9.0, was spread over vinyl-asbestos floor tile with a conventional polyurethane sponge mop applicator. After drying, a clear and colorless, smooth, continuous film coating was formed on the tile. The coated tile was subjected to periodic washings with a detergent cleaning solution and wear tests over a period of 10 weeks. The coating remained colorless and exhibited good wear and scuff resistance.

EXAMPLE 2

Aqueous cleaning and stripping compositions were prepared with the following formulations:

| Formulation A (Ammonia Type - Low pH) | |
| --- | --- |
| Constituent | Weight % |
| Deionized Water | 84.00 |
| Nonylphenoxy polyethoxy ethanol[5] | 0.44 |
| Diethanolamine | 1.70 |
| Potassium hydroxide, 45% solution | 0.30 |
| Tetrapotassium pyrophosphate | 4.91 |
| Tall oil fatty acid | 3.56 |
| Ammonium hydroxide, 26° Be' | 4.81 |
| Fragrance | 0.28 |
| | 100.00 |

At full concentration, pH was 11.1 to 11.2 and at a dilution ratio of 1:5 with water, pH was 10.7.

| Formulation B (Ammonia Type - High pH) | |
|---|---|
| Constituent | Weight % |
| Deionized Water | 83.01 |
| Nonylphenoxy polyethoxy ethanol[5] | 1.40 |
| Sodium metasilicate pentahydrate | 9.70 |
| Tall oil fatty acid | 1.03 |
| Ammonium hydroxide, 26° Be' | 4.83 |
| Fragrance and color | 0.03 |
| | 100.00 |

At full concentration, pH was 13.0 to 13.1 and, at dilution ratios of 1:4 and 1:80 with water, pH was 12.45 and 10.9, respectively.

| Formulation C (Amine Type) | |
|---|---|
| Constituent | Weight % |
| Deionized Water | 85.8 |
| Ethylene oxide-propylene oxide[6] block copolymer | 2.0 |
| Sodium metasilicate pentahydrate | 3.0 |
| Monoethanolamine | 6.0 |
| Diethylene glycol methyl ether | 3.0 |
| Fragrance and color | 0.2 |
| | 100.00 |

At full concentration, pH was 12.9 and at dilution ratios of 1:4 and 1:10 with water, pH was 12.0 and 11.65, respectively.

| Formulation D (Solvent Type) | |
|---|---|
| Constituent | Weight % |
| Deionized Water | 78.87 |
| Nonylphenoxy-polyethoxy ethanol[5] | 1.40 |
| Sodium metasilicate pentahydrate | 9.90 |
| Tall oil fatty acid | 1.03 |
| Ethylene glycol n-butyl ethanol | 8.50 |
| Fragrance and color | 0.30 |
| | 100.00 |

At full concentration, pH was 13.0 to 13.1 and at dilution ratios of 1:1 and 1:43 with water, pH was 12.9 and 11.4, respectively.

Notes:
5. Triton N-101 supplied by Rohm and Haas Co., contains 9.5 moles of ethylene oxide.
6. Pluronic L-64 supplied by BSAF Wyandotte, molecular weight of 4375.

EXAMPLE 3

Four coats of the polish composition of Example 1 were applied to vinyl-asbestos flooring over a period of four weeks, one coat being applied each seven days without intermittent surface washing or cleaning. Cleaning solutions of Example 2 at various dilution ratios were applied to the built-up film. At dilution ratios where the pH of the cleaning solution was below about 10.5, the film remained colorless and, at dilution ratios where the pH of the cleaning solutions was 10.5 or above, the film turned to a distinctive pink color, and retained that color so long as it was wetted by the solution and was sufficiently disrupted and/or partially dissolved so it was removed by mopping. After all the colored film was removed and the floor had dried, the floor had a uniformly clean appearance.

Similar results have been obtained with polish compositions containing thymolphthalein, ortho-cresolphthalein and ethyl bis (2,4-dinitrophenyl) acetate as the color indicator. However, it was found that films formed with compositions containing thymolphthalein generally did not change to a vivid blue color unless the stripper solution had a minimum pH of about 11.6.

EXAMPLE 4

A test similar to that described in Example 3 was performed using Formulation C cleaning solution of Example 2 at a dilution ratio of 1:10 (pH = 11.65). The built-up film changed to a bright pink color. The built-up film was sufficiently disrupted (apparently by the metal ion of the acrylic copolymer in the film preferentially complexing with ammonium ions in the cleaning solution) so that film was completely removed by mopping and the floor had a uniformly clean appearance after drying.

EXAMPLE 5

Formulation D cleaning solution of Example 2 was applied at full concentration (pH = 13.0 - 13.1) to a dried film formed from the polish composition of Example 1 and the film turned a bright pink color. This demonstrates the ingredients of the polish composition causes a substantial shift in the pH at which an acid base indicator normally undergoes colorless changes because the published pH indicator charts indicate that phenolphthalein is colorless when in the presence of a pH greater than 10 to 10.5.

EXAMPLE 6

A color indicating temporary protective coating was prepared with the following formulation:

| Ingredient | Weight % |
|---|---|
| Premix: | |
| Deionized Water | 10.00 |
| Potassium hydroxide, 45% solution | 1.00 |
| Phenolphthalein | 0.40 |
| Dispersion | |
| Deionized Water | 44.49 |
| Surfactant[7] | 1.00 |
| Tri-butoxyethyl phosphate | 1.00 |
| Diethylene glycol methyl ether | 4.00 |
| Anti-Foaming agent[2] | .01 |
| Formaldehyde | .10 |
| Acrylic copolymer emulstion, 38% solids[8] | 30.00 |
| Ethylene-propylene copolymer emulsion, 25% solids[4] | 4.00 |
| Alkali-soluble resin solution 25% solids[9] | 4.00 |
| | 100.00 |

[2]See Example 1
[4]See Example 1
[7]Fluorad FC-120, an anionic type fluorocarbon surface active agent containing 1% active ingredients supplied by 3M Co.
[8]Richamer R-900, supplied by The Richardson Co.
[9]Acrysol 527, supplied by Rohm and Haas Co. at 45% solids, diluted to 25% solids.

The resultant whitish translucent composition which had a pH of 8.5 to 9.0 was sprayed over the exterior and interior surface of an enameled pot and cover (with white interior) by means of an external mix spray gun. After drying, a clear colorless glossy continuous protective coating was formed on all surfaces.

After a period of one week the pot and cover were washed with a 2% solution of Spic and Span having a pH of approximately 10.5. The pink-red color of the alkaline salt form of phenolphthalein was activated and subsequent removal of the protective film caused the color to dissipate. Rinsing with potable water left the pot and its cover ready for use with no detectable residue of the protective coating.

EXAMPLE 7

A color indicating (temporary) rust inhibiting coating was prepared with the following formulation:

| Ingredient | Weight % |
| --- | --- |
| Deionized Water | 61.04 |
| Surfactant[7] | 1.00 |
| Potassium Hydroxide, 45% solution | 1.00 |
| Thymolphthalein | 0.10 |
| Antifoam[2] | 0.01 |
| Formaldehyde | 0.10 |
| Sodium gluconate | 4.00 |
| Acrylic copolymer emulsion[10] | 30.00 |
| Tri-butoxyethyl phosphate | 0.25 |
| Coalescent[11] | 2.50 |
| | 100.00 |

Notes:
[2]See Example 1
[7]See Example 6
[10]Rhoplex B-1141, supplied by Rohm and Haas Co.
[11]Dalpad A, supplied by Dow Chemical Co.

This milky white - translucent coating composition applied onto mild steel coupons by dipping and a clear, water-white rust inhibiting film was formed on the coupons.

EXAMPLE 8

A typical alkaline hot tank cleaner was prepared with the following formulation:

| Ingredient | Weight % |
| --- | --- |
| Deionized Water | 2.0 |
| Sodium hydroxide, 50% solution | 90.0 |
| Liquid gluconate rust inhibitor[12] | 8.0 |
| | 100.00 |

Notes:
[12]PMP-60, supplied by Premier Malt Products, Inc.

A 2% by weight solution of this alkaline cleaner pH 13.0 was applied by sprayer to the metal coupons coated with the temporary rust inhibiting coating in Example 7 after the coupons had been stored for 1 week. Upon application of the cleaner a blue color appeared, but quickly dissipated as the protective film was readily removed. There was no detectable residue of the protective coating thus allowing further processing and final painting or plating of the metal coupons.

From above tests, it can be seen that the aqueous base coating compositions of the invention provide a protective film on a substrate including an indicating means which, upon the application of an aqueous stripping solution having the proper alkalinity or pH, permits the user to determine whether all of the old film has been removed without waiting for the surface to become completely dry.

From the foregoing description, one skilled in the art can easily ascertain the essential characteristics of the invention, and without departing from the spirit and scope thereof, can make various changes and modifications to adapt it to various usages and conditions.

I claim:

1. An aqueous coating composition driable to provide a substantially clear finish on a substrate to which the coating composition is applied comprising
    an aqueous phase;
    a non-volatile, solid film former, which is capable of forming a smooth, substantially colorless, protective film on the substrate, uniformly dispersed in said aqueous phase;
    a sufficient amount of a dispsersing agent to form a stable dispersion of said film former in said aqueous phase and to permit said film former upon evaporation of the water to deposit therefrom as a smooth film on the substrate; and
    a water-soluble, acid-base indicator which is colored at a pH above a predetermined level and is colorless at a lower pH, said coating composition having a pH below said predetermined level and the amount of said indicator being sufficient to cause the resultant dried film to change to the color of said indicator when an aqueous stripping solution capable of disrupting the resultant dried film and having a pH above said predetermined pH is applied thereto;
    whereby, after application of said coating composition on the substrate and evaporation of the water, a substantially colorless, protective film including said indicator is formed on the surface of the substrate, and, upon subsequent application of the stripper solution to the resultant dried film, the wetted film changes to the color of said indicator.

2. A coating composition according to claim 1 wherein said indicator is selected from the group consisting of thymolphthalein, phenolphthalein, ortho-cresolphthalein, ethyl bis (2,4-dinitrophenyl) acetate, p-nitrophenol, m-nitrophenol, m-dinitrophenol, 1,3,5-trinitrophenol, and 2,4,6-trinitrophenol.

3. A coating composition according to claim 2 wherein said indicator is selected from the group consisting of thymolphthalein, phenolphthalein, ortho-cresolphthalein, and ethyl bis (2,4-dinitrophenol) acetate.

4. A coating composition according to claim 3 wherein the amount of said indicator is within the range of about 0.3 to about 4 weight %, based on the total weight of said composition.

5. A coating composition according to claim 2 wherein said composition has a pH of 10 or less.

6. A coating composition according to claim 5 wherein said film former includes an emulsifiable acrylic copolymer.

7. A coating composition according to claim 6 wherein said acrylic copolymer is ionic-crosslinked with a water-dispersible polyvalent metal compound.

8. A coating composition according to claim 5 wherein said film former includes a wax.

9. A coating composition according to claim 5 wherein said composition contains a plasticizer.

10. A coating composition according to claim 5 wherein said film former includes an alkali-soluble resin.

11. A coating composition according to claim 5 wherein said composition contains a surfactant.

12. A coating composition according to claim 5 wherein the total solids content of said composition is within the range of about 8.0 to about 45 weight %, based on the total weight of said composition.

13. An aqueous floor polish composition driable to provide substantially clear finish on resilient flooring to which the polish composition is applied comprising
    an aqueous phase;
    a non-volatile film former, which is capable of forming a smooth, substantially colorless, protective film on the flooring and includes an emulsifiable acrylic copolymer, uniformly dispersed in said aqueous phase;

a sufficient amount of a dispersing agent to form a stable dispersion of said film former in said aqueous phase and to permit said film former upon the evaporation of the water to deposit therefrom as a smooth film on the flooring; and a water-soluble, acid-base indicator which is colored at a pH above a predetermined level and is colorless at a lower pH, said polish composition having a pH below said predetermined level and the amount of said indicator being sufficient to cause the resultant dried film to change to the color of said indicator when an aqueous stripping solution capable of disrupting the resultant dried film and having a pH above said predetermined level is applied thereto;

whereby, after application of said polish composition on the flooring and evaporation of the water, a substantially colorless, protective film including said indicator is formed on the surface of the flooring, and, upon subsequent application of the stripper solution to the resultant dried film, the wetted film changes to the color of said indicator.

14. A floor polish composition wherein said indicator is selected from the group consisting of thymolphthalein, phenolphthalein, ortho-cresolphthalein and ethyl bis (2,4-dinitrophenyl) acetate.

15. A floor polish composition according to claim 14 wherein the amount of said indicator is within the range of about 0.3 to about 2 weight %, based on the total weight of the composition and the pH of said composition is 10 or less.

16. A floor polish composition according to claim 14 wherein the total solids content of said composition is within the range of about 8.0 to about 45 weight %, based on the total weight of the composition.

17. A floor polish composition according to claim 15 wherein said acrylic copolymer is ionic-crosslinked with a water-soluble polyvalent metal compound.

18. A method for treating and preserving the surface of a substrate comprising applying on the surface of the substrate an aqueous coating composition which is driable to a substantially clear finish and includes as its essential ingredients:

an aqueous base;

a non-volatile, solid film former, which is capable of forming a smooth, substantially colorless, protective film on the substrate and includes an emulsifiable acrylic copolymer, uniformly distributed in said aqueous phase;

a sufficient amount of a dispersing agent to form a stable dispersion of said film former in said aqueous phase and to permit said film former upon the evaporation of the water to deposit therefrom as a smooth film on the substrate; and an acid-base indicator which is colored at a pH above a predetermined level and is colorless at a lower pH, said coating composition having a pH below said predetermined level and the amount of said indicator being sufficient to cause the resultant dried film to change to the color of said indicator when an aqueous stripping solution capable of disrupting the resultant dried film and having a pH above said predetermined level is applied thereto;

whereby, after application of said coating composition on the substrate and evaporation of the water therefrom, a substantially colorless protective film including said indicator is formed on the surface of the substrate, and, upon subsequent application of the stripper solution to the resultant dried film, the wetted film changes to the color of said indicator.

19. A method according to claim 18 wherein said color indicator is selected from the group consisting of thymolphthalein, phenolphthalein, ortho-cresolphthalein, ethyl bis (2,4-dinitrophenyl) acetate, p-nitrophenol, m-nitrophenol, m-dinitrophenol, 1,3,5-trinitrophenol, and 2,4,6-trinitrophenol.

20. A method according to claim 19 wherein the amount of said indicator is within the range of about 0.3 to about 4 weight %, based on the total weight of said composition.

21. A method according to claim 20 including the further step of removing the dried film from the substrate when desired by applying thereto an aqueous cleaning solution which has a pH above said predetermined level and is capable of disrupting the dried film sufficiently to permit removal thereof from the substrate and expose said indicator in the film to the aqueous portion of the cleaning solution to cause the wetted film to change to the color of said indicator.

* * * * *